(12) United States Patent
Strein et al.

(10) Patent No.: US 10,616,662 B2
(45) Date of Patent: Apr. 7, 2020

(54) SYSTEMS AND METHODS TO PROVIDE VIDEO AND CONTROL SIGNALS OVER AN INTERNET PROTOCOL COMMUNICATIONS NETWORK

(71) Applicant: Disney Enterprises, Inc., Burbank, CA (US)

(72) Inventors: Michael Strein, Burbank, CA (US); Vladislav Feldman, Burbank, CA (US); Efthimis Stefanidis, Burbank, CA (US); Joseph Kenny, Burbank, CA (US); Craig Beardsley, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 330 days.

(21) Appl. No.: 15/430,861

(22) Filed: Feb. 13, 2017

(65) Prior Publication Data
US 2018/0234474 A1 Aug. 16, 2018

Related U.S. Application Data

(60) Provisional application No. 62/293,751, filed on Feb. 10, 2016.

(51) Int. Cl.
| | |
|---|---|
| *H04L 29/06* | (2006.01) |
| *H04N 21/6587* | (2011.01) |
| *H04N 21/643* | (2011.01) |
| *H04N 21/6543* | (2011.01) |
| *H04N 21/6437* | (2011.01) |
| *H04N 21/432* | (2011.01) |
| *H04N 21/6332* | (2011.01) |

(52) U.S. Cl.
CPC ..... *H04N 21/6587* (2013.01); *H04L 65/4076* (2013.01); *H04L 65/605* (2013.01); *H04L 65/608* (2013.01); *H04N 21/4325* (2013.01); *H04N 21/6437* (2013.01); *H04N 21/64322* (2013.01); *H04N 21/6543* (2013.01); *H04N 21/6332* (2013.01)

(58) Field of Classification Search
CPC . H04L 65/608; H04L 65/4076; H04L 65/605; H04N 21/64322; H04N 21/6587; H04N 21/6332
See application file for complete search history.

(56) References Cited

U.S. PATENT DOCUMENTS

| | | | |
|---|---|---|---|
| 8,638,708 B2* | 1/2014 | Kish | H04H 20/71 370/312 |
| 9,479,727 B1* | 10/2016 | Kolodizner | H04L 12/1831 |
| 2004/0233223 A1 | 11/2004 | Schkolne | |
| 2006/0256072 A1 | 11/2006 | Ueshima | |

(Continued)

OTHER PUBLICATIONS

H. Shulzrinne et al., "RTP: A Transport Protocol for Real-Time Applications," Network Working Group, RFC 3550, Jul. 2003.*

*Primary Examiner* — Oanh Duong
(74) *Attorney, Agent, or Firm* — Esplin & Associates, PC

(57) ABSTRACT

Systems and methods to provide video signals and control signals over an internet protocol (IP) communications network are presented herein. Video signals and control signals may be obtained via an IP communications network. The control signals may be associated with the video signals using synchronization source identifiers as described in IETF RFC 3550.

18 Claims, 3 Drawing Sheets

(56) References Cited

U.S. PATENT DOCUMENTS

| | | | |
|---|---|---|---|
| 2008/0198275 A1* | 8/2008 | Kinouchi | G11B 19/022 |
| | | | 348/738 |
| 2008/0274813 A1 | 11/2008 | Sato | |
| 2009/0077504 A1 | 3/2009 | Bell | |
| 2009/0196567 A1* | 8/2009 | Sugimoto | H04N 7/014 |
| | | | 386/231 |
| 2009/0280901 A1 | 11/2009 | Casparian | |
| 2010/0013860 A1 | 1/2010 | Mandella | |
| 2010/0137050 A1 | 6/2010 | Yoshida | |
| 2010/0180315 A1* | 7/2010 | Nakamichi | H04N 17/004 |
| | | | 725/116 |
| 2011/0074776 A1 | 3/2011 | Katz | |
| 2011/0128555 A1 | 6/2011 | Rotschild | |
| 2011/0138022 A1* | 6/2011 | Xie | H04L 65/1083 |
| | | | 709/219 |
| 2011/0276712 A1* | 11/2011 | Narula | H04L 65/4092 |
| | | | 709/231 |
| 2013/0042296 A1 | 2/2013 | Hastings | |
| 2013/0152153 A1* | 6/2013 | Weiser | H04L 63/0236 |
| | | | 726/1 |
| 2013/0198634 A1* | 8/2013 | Matas | G06T 11/60 |
| | | | 715/717 |
| 2014/0002329 A1 | 1/2014 | Nishimaki | |
| 2014/0056426 A1* | 2/2014 | Ducharme | H04N 21/2347 |
| | | | 380/210 |
| 2014/0104169 A1 | 4/2014 | Masselli | |
| 2014/0361956 A1 | 12/2014 | Mikhailov | |
| 2014/0364209 A1 | 12/2014 | Perry | |
| 2014/0368533 A1 | 12/2014 | Salter | |
| 2015/0170419 A1 | 6/2015 | Ohashi | |
| 2015/0194047 A1* | 7/2015 | Lu | G08C 17/02 |
| | | | 340/12.28 |
| 2015/0205494 A1 | 7/2015 | Scott | |
| 2015/0258431 A1 | 9/2015 | Stafford | |
| 2016/0054837 A1 | 2/2016 | Stafford | |
| 2016/0084960 A1 | 3/2016 | Harrison | |
| 2016/0142648 A1* | 5/2016 | Gopinath | H04N 5/4403 |
| | | | 348/705 |
| 2016/0171771 A1 | 6/2016 | Pedrotti | |
| 2016/0175702 A1 | 6/2016 | Black | |
| 2016/0187974 A1 | 6/2016 | Mallinson | |
| 2016/0196692 A1 | 7/2016 | Kjallstrom | |
| 2016/0217614 A1 | 7/2016 | Kraver | |
| 2016/0239080 A1 | 8/2016 | Marcolina | |
| 2016/0274662 A1 | 9/2016 | Rimon | |
| 2017/0054770 A1* | 2/2017 | Wells | H04L 65/403 |
| 2017/0186465 A1* | 6/2017 | Walters | G11B 27/10 |
| 2018/0070049 A1* | 3/2018 | Pinheiro e Mota | H04N 7/147 |

* cited by examiner

SYSTEMS AND METHODS TO PROVIDE VIDEO AND CONTROL SIGNALS OVER AN INTERNET PROTOCOL COMMUNICATIONS NETWORK

FIELD OF THE DISCLOSURE

The present invention relates generally to providing video and control signals over an internet protocol (IP) communications network.

BACKGROUND

Control and access systems for video and video ancillary equipment have existed for many years. Control for those systems include one or more of IP, RS-422, RS-232, and/or other methods using a standardized control interface. Uses for these control systems are timed automation, where specific clips, commercials, graphics or other content are loaded, cued and played either according to automated playlists or by manual control. Many devices work with specific protocols and commands to create complex, sequential processes. Typical IP based control systems run on their own network and have addressing schemes for their controllers and controlled devices.

SUMMARY

One aspect of the disclosure relates to a system configured to provide video and control signals over an internet protocol (IP) communications network. The system may be configured to facilitate association of a control IP stream (e.g., control signal) to a video stream (e.g., video signal).

In conventional (e.g., legacy) systems, control signals and video signals may be provided to playback devices through the use of machine control inserters, machine control separators, and/or other components. A machine control inserter may comprise apparatus that may accept control commands created by a control device, and may insert them into a video stream for carriage on a video transport. An interface may be an electrical or an optical connection such as RS-422, RS-232, and/or other forms of IP network connection. The video carriage mechanism may likely be within a VANC section of the video as standardized by SMPTE in the case of an SDI video interface, multiplexed in the case of a transport stream, and/or carried as an additional multicast in the case of a video IP stream. The machine control inserter may be implemented either as a software only module or a dedicated hardware/firmware based device. A machine control separator may comprise an apparatus that may extract control commands created by a control device from a video stream and output those commands on a physical, dedicated interface. This connects a machine control separate to the device being controlled. The interface may be an electrical or an optical connection such as RS-422, RS-232, and/or other forms of IP network connection. The machine control separator may be implemented as either as a software only module or a dedicated hardware/firmware based device. With both video and control migrating to IP, the system described herein may marry control functionality with the content portion, as the typical use case is for these controls to act upon the specific video stream. This has not yet been accomplished with the legacy systems. By associating the control signal with the content (e.g., video signal), it may be assured that wherever the video signal may be routed, the companion control signal may follow. The control portion may be considered as another part of the video signal. One or more features and/or functions of the system presented herein may remove conflicts and/or may allow the combined video/control signal to be routed over complex networks and WANs.

In some implementations, a separate control multicast may be associated with a video multicast. An IP video signal may contain a multitude of video multicasts and the control signal would need to be properly associated with its referenced content. This can be done in a variety of ways, but nominally it may be located in the RTP header of a video signal where the payload multicast references may be kept. In some implementations, a control signal may be provided as a fully encapsulated portion of a video over IP signal. The controllers and controlled devices may have their address management scheme packetized in headers of the respective signals.

The system may include one or more of one or more servers, one or more video sources, one or more automation controllers, one or more control devices, one or more playback devices, one or more decoders, and/or other components.

A video source may comprise a host and/or provider of video. By way of non-limiting illustration, a video source may include one or more of a studio, a broadcast station, a remote host, a production facility, and/or other video sources. Individual videos of one or more videos may comprise recorded video, streaming video, live streaming video, and/or other types of video formats. A video signal may be formatted in accordance with one or more real-time transport protocols (RTPs), including protocols described in one or more of IETF RFC 3550, 3551, SMPTE 2022, upcoming SMPTE 2110, and/or other sections. By way of non-limiting illustration, a video signal may include one or more RTP data packets.

An automation controller may be configured to generate and/or provide one or more control signals for one or more playback devices in a time scheduled manner. An automation controller may generate control signals of a specific type of protocols such as Sony P9 control, VDCP (Video Disk Control Protocol), as well as specific proprietary automation protocols such as one or more of Harris/Louth, Chyron Intelligent Interface, Sony Switcher, and/or standard control protocol/interfaces such as SCTE 224. An automation controller may be readable/understood by a particular playback device. By way of non-limiting illustration, an automation controller in a television environment may be configured to schedule playback of one or more of video, audio, graphic and/or other types of content and to generate control signals necessary to control one or more playback devices that may store and play such content. An automation controller may be implemented as a processing device running a software-based scheduling engine.

A control device may be configured to generate and/or provide one or more control signals. A control device may comprise an apparatus configured to communicate control signals to a remote device (e.g., a playback device) so that the remote device may be controlled. A control device may be configured to obtain status back from a remote device as well as react to that status. Status may include one or more of time position information of the remote devices, the device's state, and/or other information. A control device may comprise one or more of a hardware controller with buttons, displays and/or knobs, a software GUI application, a remote application on a handheld device, and/or other control devices. Control signals may define one or more control modes for playback of one or more videos. Control modes may include one or more of stop, play, pause, record, rewind, search, load, cue, show, advance, and/or other control modes. A display of a control device may reflect the status of a remote device, e.g., its time positional information and/or other status information. Control signals may be manually entered and/or may be automated through a timed application.

A control signal may be formatted in accordance with one or more real-time transport protocols (RTPs), including protocols described in one or more of IETF RFC 3550, 3551, SMPTE 2022, upcoming SMPTE 2110, SCTE 224, and/or other sections. By way of non-limiting illustration, a control signal may include an RTP, UDP type of unicast/multicast data packet. A control signal may include one or more of a header portion, a payload portion, and/or other parts. The header portion may include one or more of a synchronization source identifier, timing information, a source address, a destination address, and/or other information. The payload portion may include control information and/or other information. Control information may include information (e.g., commands, routines, and/or other information) configured to effectuate one or more control modes at one or more playback devices.

A playback device may be configured to effectuate reproduction of one or more of visual content, audio content, and/or other content of one or more videos. A playback device may be configured with integrated network features. A playback device may include and/or may be in communication with one or more components configured to facilitate playback of video. A playback device may include and/or may be in communication with one or more of a display for reproducing visual content, a speaker for reproducing audio content, and/or other components. By way of non-limiting illustration, a playback device may include one or more of a television, a smart TV, a set-top box, a desktop computer, a laptop computer, a tablet, a smartphone, and/or other devices.

A decoder may be configured to separate control signals and video signals from combinations of signals communicated to the decoder (e.g., via transmission component). The decoder may be suitable for playback devices that may not be IP compatible. Playback devices that may not be IP compatible may not be configured to intake associated control and video signals. The decoder may extract the control signals and video signals from signals communicated over an IP network and provide them to a playback device. The decoder may implement an interface of an electrical or an optical connection such as RS-422. The decoder may be implemented either as a software only module or a dedicated hardware/firmware based device.

The one or more servers may include one or more of one or more physical processors, non-transitory electronic storage, and/or other component. The one or more physical processors may be configured by machine-readable instructions. Executing the machine-readable instructions may cause one or more physical processors to facilitate providing video signals and control signals over one or more internet protocol (IP) communications networks. The machine-readable instructions may include one or more of a video component, a control component, an association component, a transmission component, and/or other components.

The video component may be configured to obtain one or more video signals and/or other signals via an IP communications network and/or other networks. The obtained one or more video signals may include an individual video signal and/or multicast of multiple video signals. One or more video signals may be obtained from a video source. A video signal may include one or more of a header portion, a payload portion, and/or other portions. The header portion may include a synchronization source identifier and/or other information. The payload portion may include video information defining a video. The video may include one or more of visual content, audio content, and/or other content.

The control component may be configured to obtain one or more control signals and/or other signals via an IP communications network and/or other networks. The one or more control signals may be obtained from a control device and/or other sources.

The association component may be configured to associate individual control signals with individual video signals. In some implementations, a control signal may include a header portion. The association component may be configured such that associating a control signal with a video signal may comprise providing a synchronization source identifier of a video signal in the header portion of a control signal, and/or other techniques.

The transmission component may be configured to transmit, via the IP communications network, an associated video signal and the control signal to one or more playback devices.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
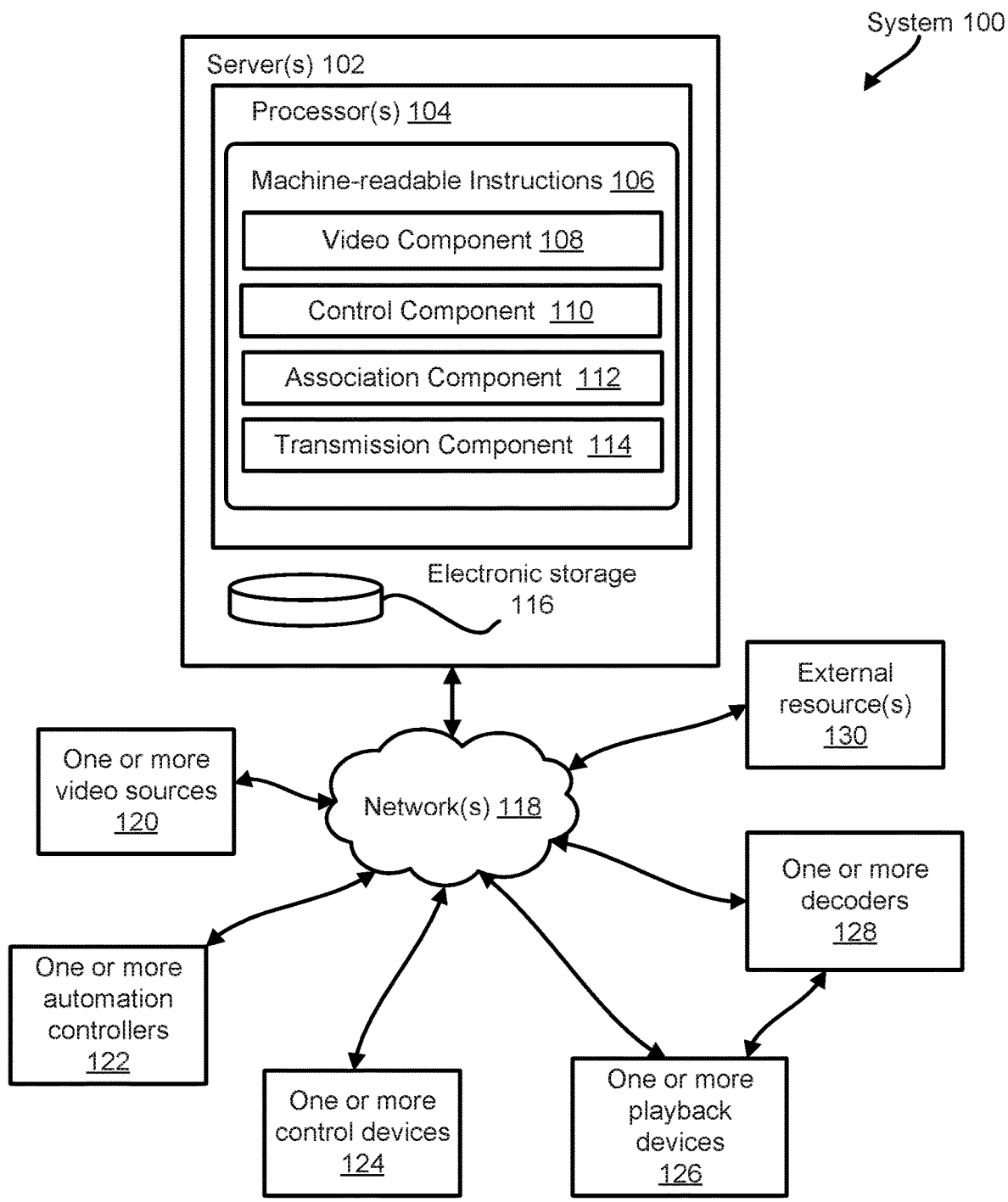
FIG. 1 illustrates a system configured to provide video and control signals over an internet protocol (IP) communications network, in accordance with one or more implementations.

FIG. 1 illustrates a system 100 configured to provide video and control signals over an internet protocol (IP) communications network. The system 100 may be configured to facilitate association of a control IP stream (e.g., control signal) to a video stream (e.g., video signal). With both video and control migrating to IP, the system described herein may marry control functionality with the content portion, as the typical use case is for these controls to act upon the specific video stream. This has not yet been accomplished with the legacy systems. By associating the control signal with the content (e.g., video signal), it may be assured that wherever the video signal may be routed, the companion control signal may follow. The control portion may be considered as another part of the video signal.

The system 100 may include one or more of one or more servers 102, one or more video sources 120, one or more automation controllers 122, one or more control devices 124, one or more playback devices 126, one or more decoders 128, and/or other components. The one or more servers 102 may include one or more of one or more physical processors 104, non-transitory electronic storage 116, and/or other components. The one or more physical processors 104 may be configured by machine-readable instructions 106. Executing the machine-readable instructions 106 may cause one or more physical processors 104 to facilitate providing video and control signals over an internet protocol (IP) communications network. The machine-readable instructions 106 may include one or more of a video component 108, a control component 110, an association component 112, a transmission component 114, and/or other components.

One or more of one or more servers 102, one or more video sources 120, one or more automation controllers 122, one or more control devices 124, one or more playback devices 126, one or more decoders 128, external resources 130, and/or other components may be operatively linked via one or more electronic communication links. For example, such electronic communication links may be established, at least in part, via network(s) 118. The network(s) 118 may include the Internet and/or other networks. For example, network(s) 118 may communicate information in accordance with the standards of the Internet protocol (IP) suite. In some implementations, communications between components of system 100 may only be carried out via an IP network.

Individual video sources of one or more video sources 120 may comprise a host and/or provider of video(s). By way of non-limiting illustration, a video source may include one or more of a studio, a broadcast station, a remote host, a production facility, and/or other video sources. Individual videos of one or more videos may comprise one or more of recorded video, streaming video, live streaming video, and/or other types of video formats. An individual video source may be configured to provide video via one or more video signals.

A video signal may be formatted in accordance with one or more real-time transport protocols (RTPs), including protocols described in one or more of IETF RFC 3550, 3551, SMPTE 2022, upcoming SMPTE 2110, SCTE 224, and/or other sections. By way of non-limiting illustration, a video signal may include an RTP data packet.

Video may be provided to one or more destinations (e.g., playback devices) via one or more video signals. A video signal may include one or more of a header portion, a payload portion, and/or other parts. The header portion (e.g., an RTP header) may include one or more of a synchronization source identifier, timing information, a source address, a destination address, and/or other information. The payload portion may include video information and/or other information.

Video information may include information defining a video. A video may include one or more of visual content, audio content, and/or other content. Visual content may include frame images of a video configured to be presented in sequence and at a rate of playback. Audio content may include audio (e.g., sound) that may accompany the visual content. Audio content may be synchronized with visual content. The video information may include compressed information defining the video. By way of non-limiting illustration, information defining a video may be encoded into a compressed format and included in a payload portion of an RTP data packet. In some implementations, video information may include information that may be readable by a playback device that may allow the playback device to reproduce audio content and/or visual content of a video.

Individual automation controllers of one or more automation controllers 122 may be configured to generate and/or provide one or more control signals for one or more playback devices in a time scheduled manner. An automation controller may generate control signals of a specific type of protocols such as Sony P9 control, VDCP (Video Disk Control Protocol) as well as specific proprietary automation protocols such as one or more of Harris/Louth, Chyron Intelligent Interface, Sony Switcher, and/or standard control protocol/interfaces such as SCTE 224. An automation controller may be readable/understood by a particular playback device. By way of non-limiting illustration, an automation controller in a television environment may be configured to schedule playback of one or more of video, audio, graphic and/or other types of content. The automation controller in a television environment may be configured to generate control signals necessary to control one or more playback devices that may store and/or play such content. An automation controller may be implemented as a processing device running a software-based scheduling engine. Example of scheduling engines include one or more of vendor specific products from companies such as one or more of Grass Valley Group, Imagine, SAM, and/or others in the media space.

Individual control devices of one or more control devices 124 may be configured to generate and/or provide one or more control signals. A control device may comprise an apparatus configured to communicate control signals to a remote device (e.g., a playback device) so that the remote device may be controlled. A control device may be configured to obtain status from a remote device and/or react to that status. Status may include one or more of time position information of the remote devices, the device's state, and/or other information.

In some implementations, a control device may comprise one or more of a hardware controller with buttons, displays and/or knobs, a software GUI application, a remote application on a handheld device, and/or other components. Control signals may define one or more control modes for playback of one or more videos. Control modes may include one or more of stop, play, pause, record, rewind, search, load, cue, show, advance, and/or other control modes. A display of a control device may reflect the status of a remote device, e.g., its time positional information and/or other status information. Control signals may be manually entered and/or may be automated through a timed application.

A control signal may be formatted in accordance with one or more real-time transport protocols (RTPs), including protocols described in one or more of IETF RFC 3550, 3551, SMPTE 2022, upcoming SMPTE 2110, SCTE 224, and/or other sections. By way of non-limiting illustration, a control signal may include an RTP data packet. A control signal may include one or more of a header portion, a payload portion, and/or other parts. The header portion may include one or more of a synchronization source identifier, timing information, a source address, a destination address, and/or other information. The payload portion may include control information and/or other information. Control information may include information configured to effectuate one or more control modes at one or more playback devices.

Individual playback devices of one or more playback devices 126 may be configured to effectuate reproduction of one or more of visual content, audio content, and/or other content of one or more videos. A playback device may be configured with integrated network features. A playback device may include and/or may be in communication with one or more components configured to facilitate playback of video. A playback device may include and/or may be in communication with one or more of a display for reproducing visual content, a speaker for reproducing audio content, and/or other components. By way of non-limiting illustration, a playback device may include one or more of a television, a smart TV, a set-top box, a desktop computer, a laptop computer, a tablet, a smartphone, and/or other devices.

Individual decoders of one or more decoders 128 may be configured to separate control signals and video signals from combinations of signals communicated to the decoder (e.g., via transmission component 114). The decoder may be suitable for playback devices that may not be IP compatible. Playback devices that may not be IP compatible may not be configured to intake associated control and video signals. The decoder may extract the control signals and video signals from signals communicated over an IP network and provide them to a playback device. The decoder may implement an interface of an electrical or an optical connection such as RS-422. The decoder may be implemented either as a software only module or a dedicated hardware/firmware based device. In some implementations, individual playback devices may be configured to receive the video signals themselves, and decode and send the signals as analog (NTSC) or digital SDI (SMPTE 259, 274, 292 or 296).

The video component 108 may be configured to obtain one or more video signals via an IP communications network (e.g., network(s) 118). The one or more video signals may be a multicast video signal. A video signal may be obtained from one or more video sources 120 and/or other sources.

The control component 110 may be configured to obtain one or more control signals via an IP communications network (e.g., network(s) 118). The one or more control signals may be obtained from one or more of one or more control devices 124, one or more automation controllers 122, and/or other sources.

The association component 112 may be configured to associate one or more control signals with one or more video signals. A control signal may be associated with a video signal having a destination (e.g., a playback device) of which the control signal is controlling. Association of a control signal with a video signal may be based on IETF RFC 3550 and/or other information. By way of non-limiting illustration, a video signal may include one or more of a header portion, a payload portion, and/or other portions. The header portion may include a synchronization source identifier in accordance with IETF RFC 3550, and/or other information. A control signal may include one or more of a second header portion, a second payload portion, and/or other information. The association component 112 may be configured such that associating a control signal with a video signal may comprise providing a synchronization source identifier of a video signal in a second header portion of a control signal. In some implementations, configurations within individual playback devices may decide which control signal may be appropriately associated with a signal source.

The transmission component 114 may be configured to effectuate transmission, via an IP communications network (e.g., network(s) 118), of one or more video signals and one or more control signals to one or more playback devices. The transmission component 114 may be configured to assure the association of control signals are done appropriately for carriage on standard IP networks.

Figure 2:
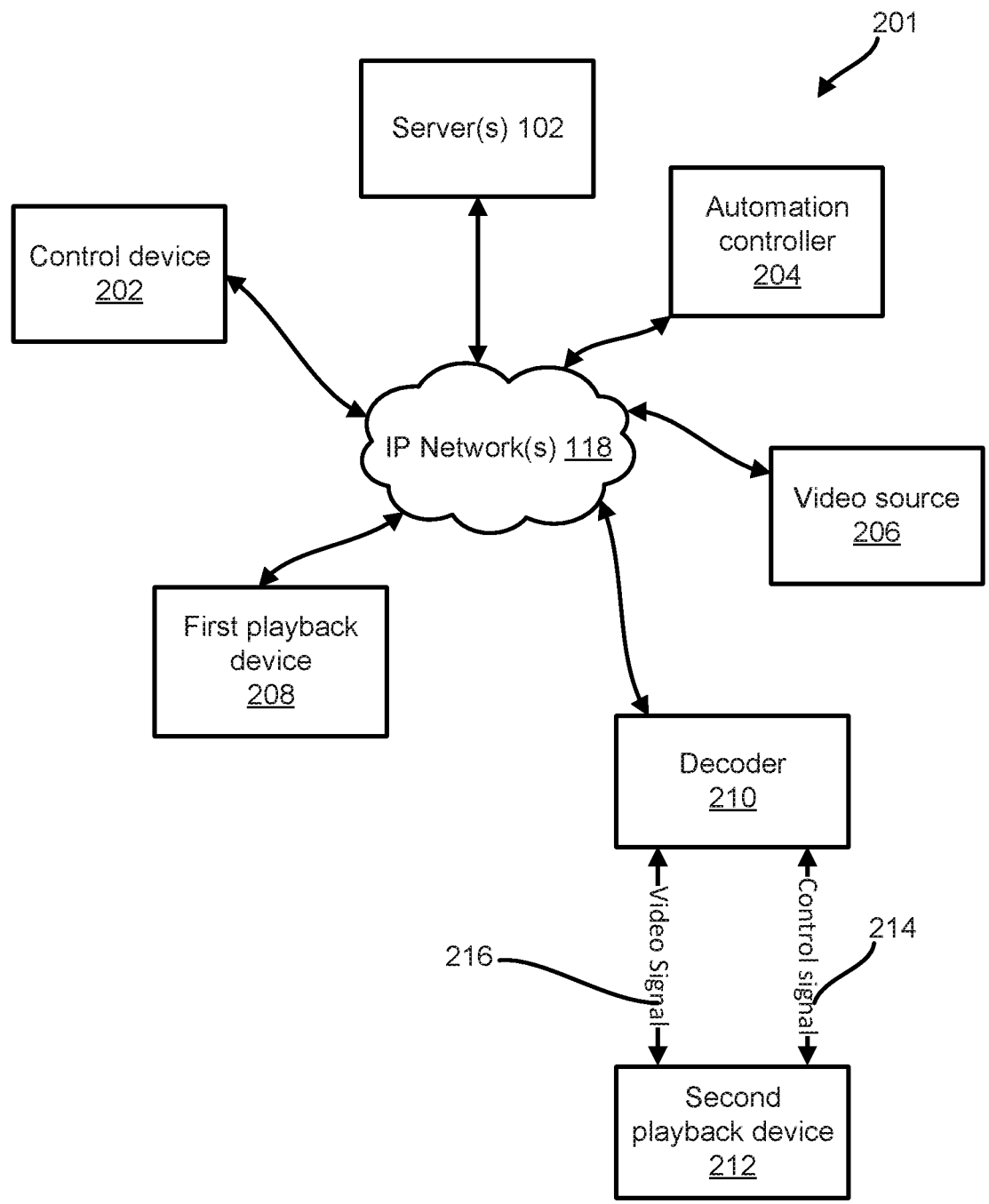
FIG. 2 illustrates an exemplary implementation of a system configured to provide video and control signals over an internet protocol (IP) communications network, in accordance with one or more implementations.

FIG. 2 illustrates an exemplary implementation of system 201 configured to provide video and control signals over an internet protocol (IP) communications network, in accordance with one or more implementations. The system 201 may be the same or similar to system 100 in FIG. 1. The system 201 may include one or more of a control device 202, an automation controller 204, a video source 206, one or more servers 102 (e.g., the same as or similar to one or more servers 102 in FIG. 1), a first playback device 208, a second playback device 212, a decoder 210, and/or other components.

The control device 202 may be configured to provide one or more control signals to server(s) 102. The control signals provided by control device 202 may include control information and/or other information. The control information may include information (e.g., commands, routines, and/or other information) configured to effectuate one or more control modes at first playback device 208, second playback device 212, and/or other playback devices. The automation controller 204 may be configured to provide control signals of a specific type of automation protocol. The video source 206 may be configured to provide one or more video signals to server(s) 102. The one or more video signals may be a multicast video signal.

The server(s) 102 may be configured to associate video signals with control signals (e.g., via an association component the same or similar to association component 112 presented herein). The server(s) 102 may be configured to effectuate transmission of associated control signals and video signals to first playback device 208, second playback device 212, and/or other playback devices. The first playback device 208 may be configured with integrated network features. The first playback device 208 may receive combinations of control signals and associated video signals to effectuate playback of video at first playback device 208. The second playback device 212 may not be configured with integrated network features. The second playback device 212 may be a legacy device. The second playback device 212 may effectuate playback of video at second playback device 212 using decoder 210. The decoder 210 may be configured to separate control signals and video signals from combinations of signals communicated to decoder 212. The decoder 210 may extract control signals 214 and video signals 216 from signals communicated over an IP network 118 from server(s) 102. In some implementations, communications between components of system 201 may only be accomplished via IP network 118.

Returning to FIG. 1, one or more processors 104 may include communication lines or ports to enable the exchange of information with a network and/or other computing platforms. Illustration of one or more processors 104 in FIG. 1 is not intended to be limiting. The one or more processors 104 may include a plurality of hardware, software, and/or firmware components operating together to provide the functionality attributed herein to one or more processors 104. For example, one or more processors 104 may be implemented by a cloud of computing platforms operating together as one or more processors 104.

The electronic storage 116 may comprise electronic storage media that electronically stores information. The electronic storage media of electronic storage 116 may include one or both of system storage that is provided integrally (i.e., substantially non-removable) with one or more servers 102 and/or removable storage that is removably connectable to one or more servers 102 via, for example, a port or a drive. A port may include a USB port, a firewire port, and/or other port. A drive may include a disk drive and/or other drive. The electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). The electronic storage 116 may store software algorithms, information determined by processor(s) 104, information received from one or more other components of system 100, and/or other information that enables one or more servers 102 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 112, and/or 114. Processor(s) 104 may be configured to execute components 108, 110, 112, and/or 114 by software; hardware; firmware; some combination of software, hardware, and/or firmware; and/or other mechanisms for configuring processing capabilities on processor(s) 104.

It should be appreciated that although components 108, 110, 112, and/or 114 are illustrated in FIG. 1 as being co-located within a single processing unit, in implementations in which processor(s) 104 includes multiple processing units, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114, and/or other components. As another example, processor(s) 104 may be configured to execute one or more additional components that may perform some or all of the functionality attributed below to one of components 108, 110, 112, and/or 114.

Figure 3:
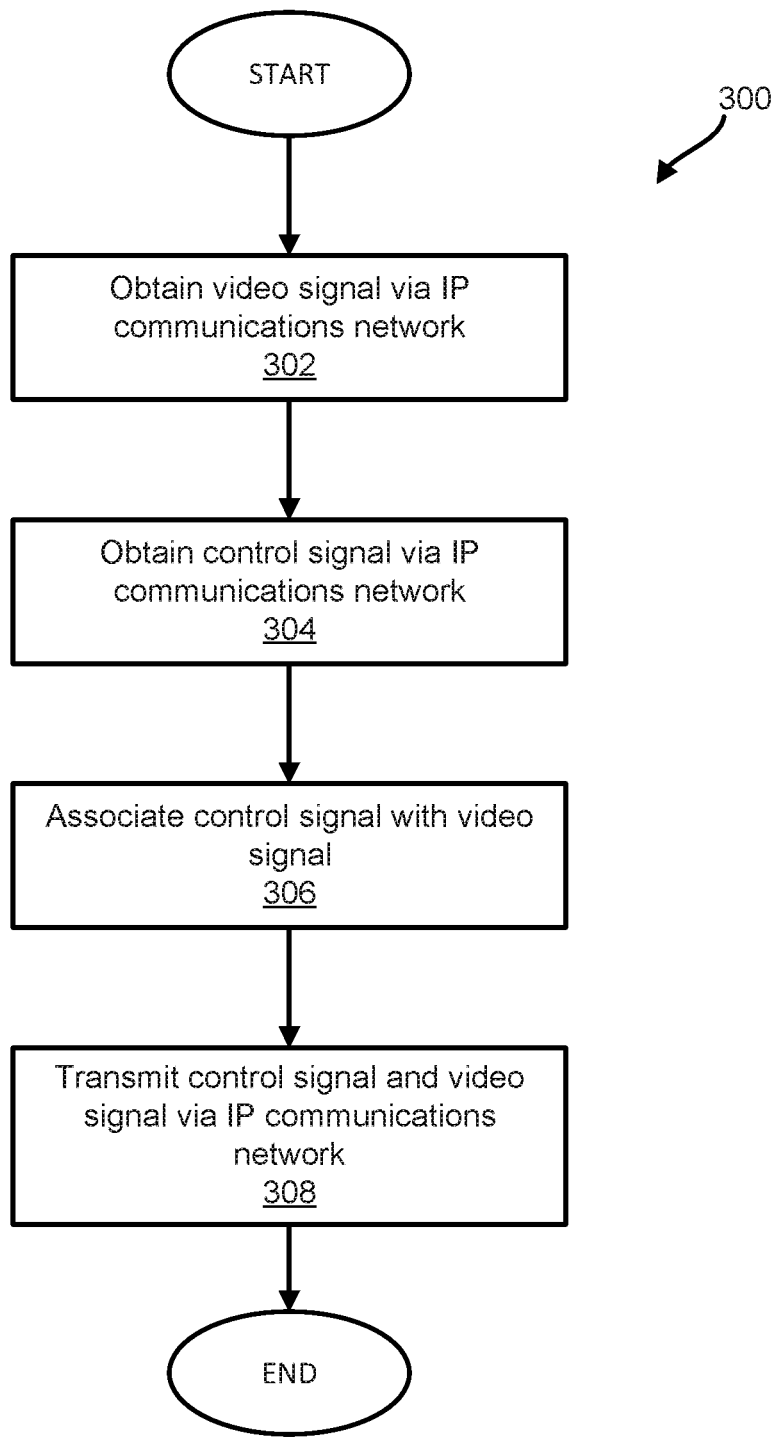
FIG. 3 illustrates a method to provide video and control signals over an internet protocol (IP) communications network, in accordance with one or more implementations.

FIG. 3 illustrates a method 300 to provide video and control signals over an internet protocol (IP) communications network, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in a system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more video sources, one or more automation controllers, one or more control devices, one or more playback devices, one or more decoders, and/or other components. The one or more processing devices may include one or more devices executing some or all of the operations of method 300 in response to instructions stored electronically on electronic storage medium. The one or more processing devices may include one or more devices configured through hardware, firmware, and/or software to be specifically designed for execution of one or more of the operations of method 300.

At an operation 302, a video signal may be obtained via an IP communications network. The video signal may include one or more of a header portion, a payload portion, and/or other portions carrying information. The header portion may include a synchronization source identifier and/or other information. The payload portion may include video information defining a video, and/or other information. The video may include one or more of visual content, audio content, and/or other content. In some implementations, operation 302 may be performed by one or more physical processors executing a video component the same as or similar to video component 108 (shown in FIG. 1 and described herein).

At an operation 304, a control signal may be obtained via an IP communications network. The control signal may include control information defining one or more control modes for playback of video. In some implementations, operation 304 may be performed by one or more physical processors executing a control component the same as or similar to control component 110 (shown in FIG. 1 and described herein).

At an operation 306, a control signal may be associated with a video signal. In some implementations, operation 306 may be performed by one or more physical processors executing an association component the same as or similar to association component 112 (shown in FIG. 1 and described herein).

At an operation 308, transmission may be effectuated, via an IP communications network, of a video signal and a control signal to one or more playback devices. In some implementations, operation 308 may be performed by one or more physical processors executing a transmission component the same as or similar to transmission component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. It is to be understood that the present technology contemplates that one or more features of any claim can be dependent on and/or combined with one or more features of any other claim.

What is claimed is:

1. A system configured to provide video signals and control signals over an internet protocol (IP) communications network, the system comprising:
one or more physical processors executing machine-readable instructions causing the one or more physical processors to:
obtain a video signal for a video via an IP communications network, the video signal including a header portion and a payload portion, the header portion including a synchronization source identifier identifying a video source of the video signal, the payload portion including video information defining the video;
obtain a control signal via the IP communications network, the control signal including a second header portion and control information defining one or more control modes for playback of the video, the control signal originating from a control device;
determine the synchronization source identifier from the header portion of the video signal;
modify the control signal by providing the synchronization source identifier in the second header portion of the control signal to associate the control signal with the video signal; and
effectuate transmission, via the IP communications network, of both the video signal and the control signal having the synchronization source identifier in the second header portion to one or more playback devices.

2. The system of claim 1, wherein the video signal and the control signal individually comprise individual real-time transport protocol (RTP) data packets.

3. The system of claim 1, wherein the one or more control modes include stop, play, pause, record, rewind, search, load, cue, show, advance, or a combination thereof.

4. The system of claim 1, wherein the one or more playback devices comprise a first playback device, wherein the first playback device is configured with integrated network features.

5. The system of claim 1, wherein the video signal is obtained from the video source and the control signal is obtained from the control device.

6. The system of claim 1, wherein the obtaining the video signal, obtaining the control signal, and transmitting the video signal and the control signal are only accomplished via the IP communications network.

7. The system of claim 1, wherein the video signal comprises part of a video multicast, the control signal comprises part of a control multicast, and the control signal is associated with the video signal to ensure the control information is applied to the video signal and no other video signal included in the video multicast.

8. The system of claim 1, wherein the second header portion further includes timing information, a source address, a destination address, or a combination thereof.

9. The system of claim 1, wherein the video source comprises a studio, a broadcast station, a production facility, or a combination thereof.

10. A method to provide video signals and control signals over an internet protocol (IP) communications network, the method being implemented in a computer system comprising one or more physical processors and storage media storing machine-readable instructions, the method comprising:
obtaining a video signal for a video via an IP communications network, the video signal including a header portion and a payload portion, the header portion including a synchronization source identifier identifying a video source of the video signal, the payload portion including video information defining the video;
obtaining a control signal via the IP communications network, the control signal including a second header portion and control information defining one or more control modes for playback of the video, the control signal originating from a control device;
determining the synchronization source identifier from the header portion of the video signal;
modifying the control signal by providing the synchronization source identifier in the second header portion of the control signal to associate the control signal with the video signal; and
effectuating transmission, via the IP communications network, of both the video signal and the control signal having the synchronization source identifier in the second header portion to one or more playback devices.

11. The method of claim 10, wherein the video signal and the control signal individually comprise individual real-time transport protocol (RTP) data packets.

12. The method of claim 10, wherein the one or more control modes include stop, play, pause, record, rewind, search, load, cue, show, advance, or a combination thereof.

13. The method of claim 10, wherein the one or more playback devices comprise a first playback device, wherein the first playback device is configured with integrated network features.

14. The method of claim 10, wherein the video signal is obtained from the video source and the control signal is obtained from the control device.

15. The method of claim 10, wherein the obtaining the video signal, obtaining the control signal, and transmitting the video signal and the control signal are only accomplished via the IP communications network.

16. The method of claim 10, wherein the video signal comprises part of a video multicast, the control signal comprises part of a control multicast, and the control signal is associated with the video signal to ensure the control information is applied to the video signal and no other video signal included in the video multicast.

17. The method of claim 10, wherein the second header portion further includes timing information, a source address, a destination address, or a combination thereof.

18. The method of claim 10, wherein the video source comprises a studio, a broadcast station, a production facility, or a combination thereof.

* * * * *

UNITED STATES PATENT AND TRADEMARK OFFICE
CERTIFICATE OF CORRECTION

| | | |
|---|---|---|
| PATENT NO. | : 10,616,662 B2 | Page 1 of 1 |
| APPLICATION NO. | : 15/430861 | |
| DATED | : April 7, 2020 | |
| INVENTOR(S) | : Michael Strein et al. | |

It is certified that error appears in the above-identified patent and that said Letters Patent is hereby corrected as shown below:

On the Title Page

Please delete "Related U.S. Application Data (60) Provisional application No. 62/293,751, filed on Feb. 10, 2016."

Signed and Sealed this
Third Day of February, 2026

John A. Squires
*Director of the United States Patent and Trademark Office*